US008547935B2

(12) United States Patent
Keller et al.

(10) Patent No.: US 8,547,935 B2
(45) Date of Patent: Oct. 1, 2013

(54) METHOD AND APPARATUS FOR SR-VCC REVOCATION PROCEDURE

(75) Inventors: Rall Keller, Wurselen (DE); Magnus Hallenstal, Taby (SE); Magnus Olsson, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 154 days.

(21) Appl. No.: 13/121,880

(22) PCT Filed: Aug. 24, 2009

(86) PCT No.: PCT/IB2009/006617
§ 371 (c)(1),
(2), (4) Date: May 10, 2011

(87) PCT Pub. No.: WO2010/038116
PCT Pub. Date: Apr. 8, 2010

(65) Prior Publication Data
US 2011/0206010 A1    Aug. 25, 2011

Related U.S. Application Data

(60) Provisional application No. 61/101,207, filed on Sep. 30, 2008.

(51) Int. Cl.
*H04W 4/00* (2009.01)
*H04W 36/00* (2009.01)

(52) U.S. Cl.
USPC .......................................... 370/331; 455/439

(58) Field of Classification Search
USPC ................ 370/329–332, 341; 455/436–439, 455/442–445
See application file for complete search history.

(56) References Cited

U.S. PATENT DOCUMENTS

| 2004/0266435 A1* | 12/2004 | de Jong et al. ................ 455/436 |
| 2009/0047965 A1* | 2/2009 | Godin et al. .................. 455/438 |
| 2009/0296660 A1* | 12/2009 | Weng ............................ 370/332 |

(Continued)

FOREIGN PATENT DOCUMENTS

WO   WO 2008/095447   *   8/2008

OTHER PUBLICATIONS

Vodafone: "S2-085736 Handover Failure, handling for SR-VCC" 3GPP TSG-SA2 Meeting #67, [Online] Aug. 25-29, 2008 pp. 1-2. XP002563806 Sophia Antipolis, France Retrieved from the Internet:URL:http://ftp.3gpp.org/specs/html-info/TDocExMtg-S2-67-26589.htm>.

(Continued)

*Primary Examiner* — Kerri Rose

(57) ABSTRACT

The basic concept of the invention is to expand the capabilities of the MSC Server enhanced for SR-VCC and of the SCC AS to support a "session transfer revocation" procedure. To allow for such procedure it is envisaged that a MSC-Server enhanced for SR-VCC being involved in a Handover procedure for a call from a source RAN, e.g. E-UTRAN/UTRAN HSPA, to a target RAN, e.g. GERAN/UTRAN CS, sends an indication that a session transfer for said call should be performed towards the target RAN. Once the MSC-Server receives from a mobility management entity, such as MME or SGSN, of the source RAN an indication that a relocation request having initiated the session transfer indication is canceled, the MSC-Server may send an indication that the session transfer should be cancelled towards the SCC AS in the IMS which has performed the session transfer.

15 Claims, 4 Drawing Sheets

(56) References Cited

U.S. PATENT DOCUMENTS

2010/0034168 A1* 2/2010 Mahdi .......................... 370/331

OTHER PUBLICATIONS

Ericsson et al. "SRVCC failure handling: return to PS" 3GPP Draft; S2-0B7461 Disc SRVCC Return to PS, 3rd Generation Partnership Project (3GPP), Mobile Competence Centre; 650, Route Des Lucioles ; F-06921 Sophia-Antipolis Cedex ; France. No. Mi ami; 200BI112,: Nov. 12, 2008, XP050331920 [retrieved on Nov. 12, 2008] the whoie document.

* cited by examiner

METHOD AND APPARATUS FOR SR-VCC REVOCATION PROCEDURE

This application claims the benefit of U.S. Provisional Application No. 61/101,207, filed Sep. 30, 2008, the disclosure of which is fully incorporated herein by reference.

TECHNICAL FIELD

Mobile networks are currently evolving from pure circuit switched (CS) networks towards IP based networks. In doing so, they integrate and are integrated into IP based infrastructure that is also used for the Internet, the World Wide Web and the datacom industry in general. With this trend mobile networks closely follow the evolution steps of the wireline networks.

BACKGROUND

Operators of mobile communication networks, such as GSM/WCDMA operators, that install IMS (IP Multimedia Subsystem) networks and offer IMS services want to make these IMS services available also to their subscribers within the Circuit Switched Domain. Hereto, calls from and to this group of (GSM/WCDMA) subscribers need to be routed through the IMS network in order to reach a respective IMS service engine offering the respective service. This concept is also known as IMS Centralized Services (ICS). The IMS Centralized Services work item in 3$^{rd}$ Generation Partnership Program (3GPP) targets using the Circuit Switched network as access to IMS services, (see 3GPP Technical Specification TS 23.292) and is complemented by IMS Service Continuity (see 3GPP TS 23.237).

In parallel to the ICS trend the packet core is evolving (Evolved Packet Core, EPC) as part of the Evolved Packet System (EPS), supporting Evolved UTRAN (E-UTRAN) as new radio access network. Single Radio-Voice Call Continuity (SR-VCC) within said framework would allow for Handover of an IMS voice call from EPS to CS. This is what is currently supported by standards. It is envisioned that SR-VCC is combined with ICS for an IMS centralized solution supporting also SR-VCC from E-UTRAN to UTRAN/GERAN. In the following the terminology of EPS and UTRAN/GERAN CS will be used synonymously.

In FIG. 1 an exemplary architecture is displayed; an MSC Server which is enhanced for SR-VCC has either an ISUP (ISDN User Part) or an SIP (Session Initiate Protocol) interface. For the purpose of this application, it is assumed in the following that the enhanced MSC Server has a SIP interface.

Within said architecture a Handover of an IMS voice call from EPS/LTE towards GERAN/UTRAN CS is conceptually shown. In the lower part, the UE being connected via the E-UTRAN towards the IMS network via the Serving/PDN gateway is shown. This User Equipment is now to be handed over (as indicated by the arrow on the left side) towards the UTRAN/GERAN CS in which it would be connected to the IMS network via the Target UTRAN/GERAN and the MSC-Server. Other entities than the MME which will be detailed in the following, e.g. a SGSN (serving Gateway Signaling Node) and a HSS (Home Subscriber Server) are only shown for completeness but are not necessary to understand the invention.

FIG. 2 depicts an exemplary flowchart, illustrating a Handover from an LTE/EPS system (E-UTRAN) towards a UTRAN/GERAN CS system as exemplified in the architecture of FIG. 1.

Within said scheme due to some reasons, e.g., measurement reports as indicated in step 1 of FIG. 2, lead to decision in the source E-UTRAN/HSPA (lower portion of FIG. 1) to initiate a handover towards a target UTRAN/GERAN CS, i.e. the upper portion in FIG. 1. The relocation request is sent towards the MSC-Server which prepares the Target network (Target MSC, Target BSS) for the handover (steps 4 through 7). Thereafter in step 8, a transfer of the session is initiated towards the IMS. After step 8, the Service Centralization and Continuity Application Server (SCC AS) in the IMS (an SCC AS correlates Service Control Signaling and CS Control Signaling for a session in IMS) has performed the session transfer for speech media, i.e., the remote end within the IMS has been updated to send speech media to the MGW controlled by the MSC Server enhanced for SR-VCC and not longer over E-UTRAN to the User Equipment (UE).

While the eNode B as part of the Source E-UTRAN has decided in step 2 to perform a handover (decision to HO) which causes the Mobility Management Entity (MME, e.g., SGSN) to send a Forward Relocation Request towards the MSC Server), it is allowed that the eNode B part of the Source E-UTRAN may decide later that it is no longer required to perform handover, e.g., due to newer measurement reports. In such a case and in case of a Packet Switched (PS) handover, the eNode B would inform the MME accordingly (or the NodeB would inform the SGSN) and the PS handover procedure would be stopped and all bearers would remain in the EPS.

However, when the eNode B would decide to not require handover after the session transfer has been initiated by the MSC Server enhanced for SR-VCC (step 9), the UE would stay in E-UTRAN but the speech media would have been already sent to the target MSC Server enhanced for SR-VCC. Thereby the user would not be able to continue his phone call, since the media and the related SIP control signaling would be directed towards the target MSC Server/MGW and not via E-UTRAN.

SUMMARY

In one solution to the problem described it is envisaged that when the eNode B indicates a required handover and SR-VCC is possible, then the eNode B is not allowed to stop the handover and therefore SR-VCC procedure is always completed.

However, this has at least the drawback that the UE has to perform handover to UTRAN or GERAN also in case the radio conditions would allow the UE to stay in E-UTRAN. This is because of the fact that an eNode B can only indicate that SR-VCC shall be performed in case speech media is present, but it is the MME that knows that speech media is present and hence only the MME can decide to perform SR-VCC.

In another solution it is envisaged that the MSC Server could send the session transfer request after a handover complete message (step 13) arrives from the target RAN. However, this would increase the voice call interruption time, and this should be avoided.

Similar problems arise when a SR-VCC enabled User Equipment has started the session transfer procedure and detects later-on that it would actually prefer to stay in the transferring-out access. It would be preferable to expand the capabilities of the MSC Server enhanced for SR-VCC and of the SCC AS to support a "session transfer revocation" procedure.

In a session transfer revocation procedure a MSC-Server, enhanced for SR-VCC, being involved in a Handover procedure for a call from a source RAN (E-UTRAN/UTRAN) to a target RAN (GERAN/UTRAN CS), sends an indication that a session transfer for said call should be performed towards the target RAN. Once the MSC-Server receives from a mobility management entity (MME or SGSN) of the source RAN an indication that a relocation request having initiated the session transfer indication is canceled, the MSC-Server may send an indication that the session transfer should be cancelled towards the SCC AS in the IMS which has performed the session transfer.

In an alternative embodiment a MSC-Server enhanced for SR-VCC being involved in a Handover procedure for a call from a source RAN (E-UTRAN/UTRAN) to a target RAN (GERAN/UTRAN CS), sends an indication that a session transfer for said call should be prepared but not yet activated towards the target RAN. Once the MSC-Server receives from a mobility management entity (MME or SGSN) of the source RAN an indication that a relocation request that initiated the session transfer is canceled the MSC-Server sends an indication that the prepared session transfer should be cancelled towards the SCC AS in the IMS which has performed the session transfer.

On the other hand the invention also pertains to a SCC AS being involved in a Handover procedure for a call from a source RAN (E-UTRAN/UTRAN) to a target RAN (GERAN/UTRAN CS). Said SCC AS receives as outlined above an indication that a session transfer should be performed from a MSC Server enhanced for SR-VCC of the source RAN. The SCC AS stores SDP information for media over said source RAN for said call and upon receiving an indication that the session transfer should be cancelled from said MSC Server enhanced for S-VCC, the SCC AS updates the remote end of the call to send the respective media to the UE involved in said call via source RAN (E-UTRAN/UTRAN).

Although the invention is described at first with respect to a revocation initiated by an MSC-S, the proposed solution in its generality can also be applied to the UE.

Furthermore, inventive apparatuses are disclosed embodying the invention as described and in addition, various embodiments providing further enhancements are provided.

DETAILED DESCRIPTION

In the following description of the invention, two accesses, a transferring-out access and a transferring-in access, are described while not being fixed to a specific number of accesses. Furthermore, while in the example it is referred to E-UTRAN to CS (GERAN or UTRAN), the invention is not limited thereto but also applicable to VoIP (Voice over IP) over UTRAN HSPA (High Speed Packet Access) to UTRAN/GERAN CS.

The present invention extends the capability of the SCC AS to keep track of SDP and other information of previously used accesses.

Although the invention is described at first with respect to a revocation initiated by an MSC-S, the proposed solution in its generality can also be applied to the UE.

If the MSC Server enhanced for SR-VCC receives an indication from the MME (or SGSN) that a forward relocation request is canceled, it performs the following:

The MSC Server, enhanced for SR-VCC, sends a "session transfer revocation" request towards the SCC AS in the IMS. In doing so the SCC AS is instructed to revoke the session transfer request. In an embodiment this can be done using SIP INVITE indicating no media or indicating revoke media or SIP INFO including necessary parameters or the like.

The SCC AS, upon receipt of such a "session transfer revocation" request, updates the remote end to send the media to the UE via E-UTRAN. To enable such an update, the SCC AS keeps information needed, such as SDP information for media over E-UTRAN and hence can construct a SIP re-INVITE to the remote end correctly.

As indicated the above outlined invention can likewise be applied to the UE:

if the UE has started the session transfer procedure and detects sooner or later that it would actually prefer to stay in the transferring-out access, it can initiate the session transfer revocation procedure on the transferring-in access instead of a second session transfer request on the transferring-out access.

If the SR-VCC capable UE receives the HandOver command (step 11 of FIG. 2), but fails to access a GERAN/UTRAN network, then it immediately returns to E-UTRAN. Then the UE, since it is SR-VCC capable, should assume that SR-VCC has been initiated by the network and shall then send a session transfer revocation request via Gm interface, instructing the SCC AS to revoke the settings prior to the session transfer request sent out by the MSC Server. Note that the session transfer has been initiated by the MSC Server and hence the UE has not performed session transfer from E-UTRAN and has not camped on GERAN/UTRAN network access.

Figure 1:
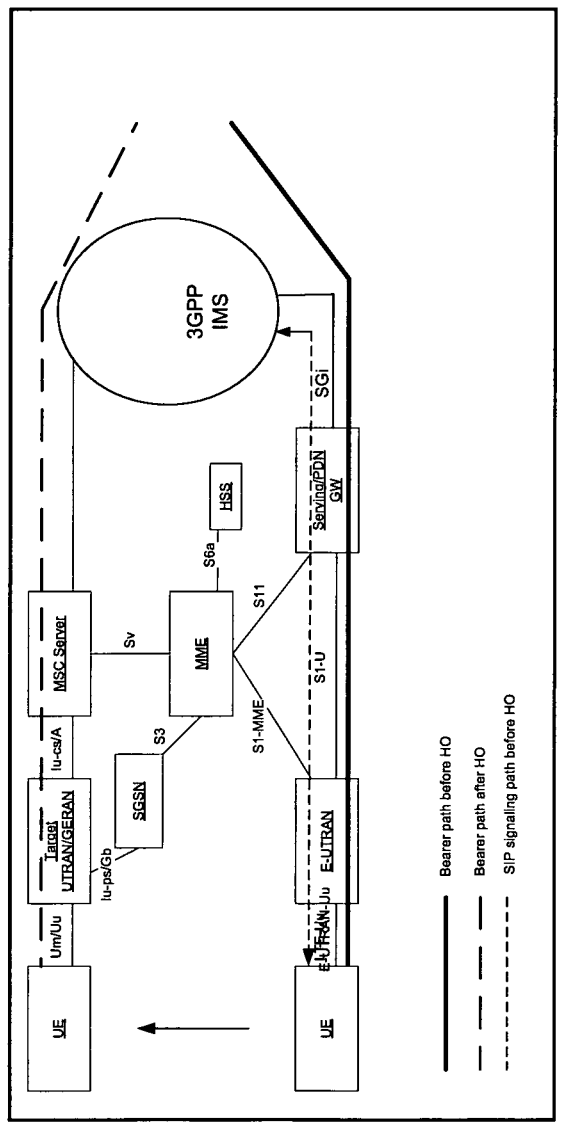
FIG. 1 shows an exemplary SR-VCC architecture figure.
Figure 2:
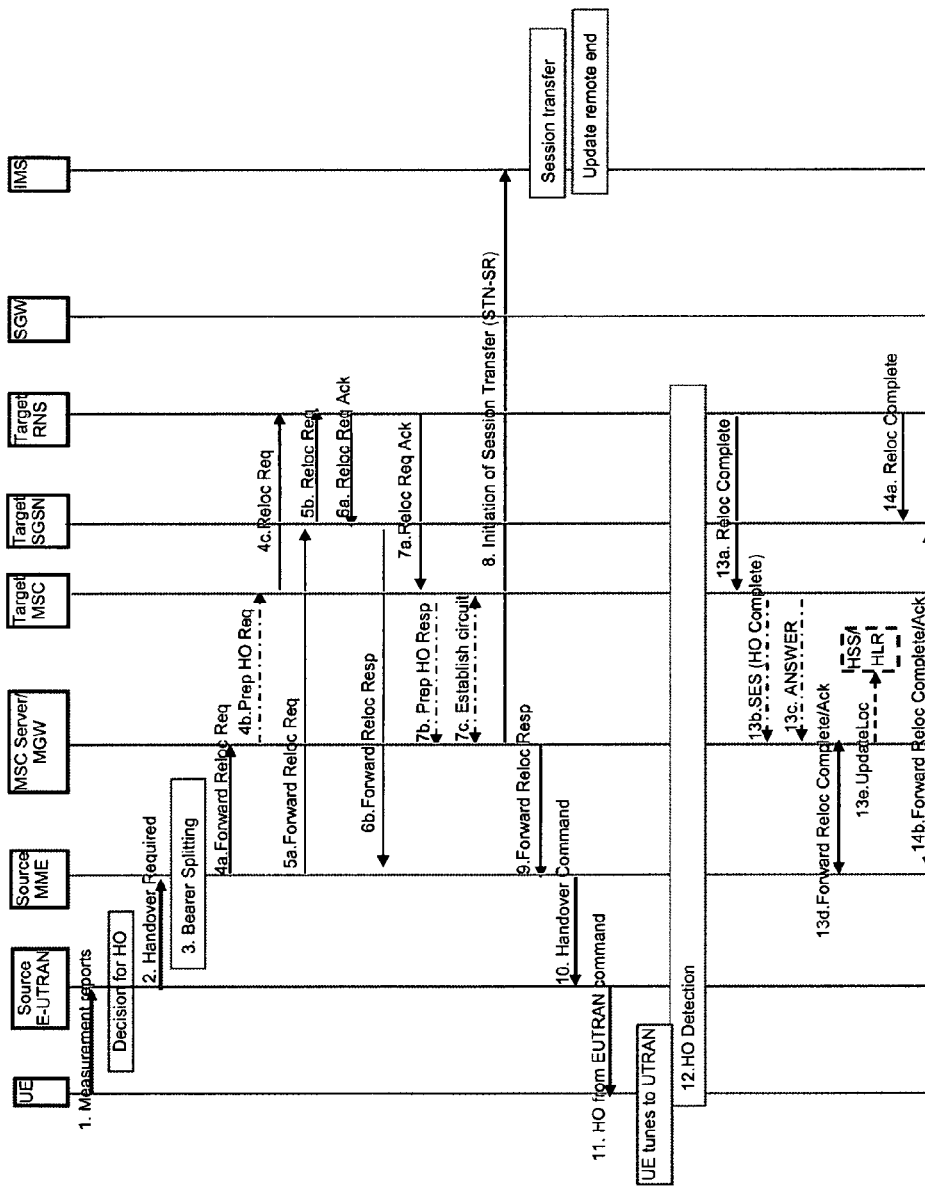
FIG. 2 shows an exemplary flowchart illustrating a Handover from an LTE/EPS system (E-UTRAN) towards a UTRAN/GERAN CS system.

In another embodiment of the invention instead of sending a session transfer request in step 8 of FIG. 2, the following steps are performed:

Within step 8, the MSC Server, enhanced for SR-VCC, informs the SCC AS, e.g. by using a "Session Transfer Prepare" message, to hold the session on EPS. The session is kept until the SCC AS receives an indication from the MSC Server that HandOver (HO) has occurred.

In this embodiment first resources for the envisaged handover are prepared, on the control plane and if necessary also on the user plane. When SCC AS receives an indication for a "Session Transfer Prepare", it should not activate transfer until an activation command is received from the MSC Server enhanced for SR-VCC.

In an embodiment of the invention said activation is received, once the MSC Server enhanced for SR-VCC is sure that the Handover is complete, e.g. after the Handover Complete (step 13).

In an embodiment the "Session Transfer Prepare" indication can be sent using SIP INVITE. It might be necessary to send some indication along that the SIP INVITE is just a preparation.

In an embodiment, following step 13, the MSC Server enhanced for SR-VCC sends the "Session Transfer Activation" command, which could be a SIP INFO message. On receipt of the "Session Transfer Activation" message, the session transfer is performed including an update of the remote end. The "Session Transfer Activation" is not sent in case the relocation request is canceled; where either the session transfer preparation is timed out or, alternatively and preferred, the MSC Server enhanced for SR-VCC sends an indication that the Session Transfer is canceled, e.g. by sending a "Session Transfer Cancel" command to the SCC AS. In both cases the SCC AS continues the session on EPS.

The invention provides for one or more of the following advantages. By means of the invention it is possible that a UE can stay in E-UTRAN (or HS) when the radio conditions allow. Furthermore, a UE is not affected if the revocation is started by the MSC Server. The proposed solutions are more robust in case either the eNode B decides to cancel the relocation request or the UE fails to access GERAN/UTRAN CS.

Figure 3:
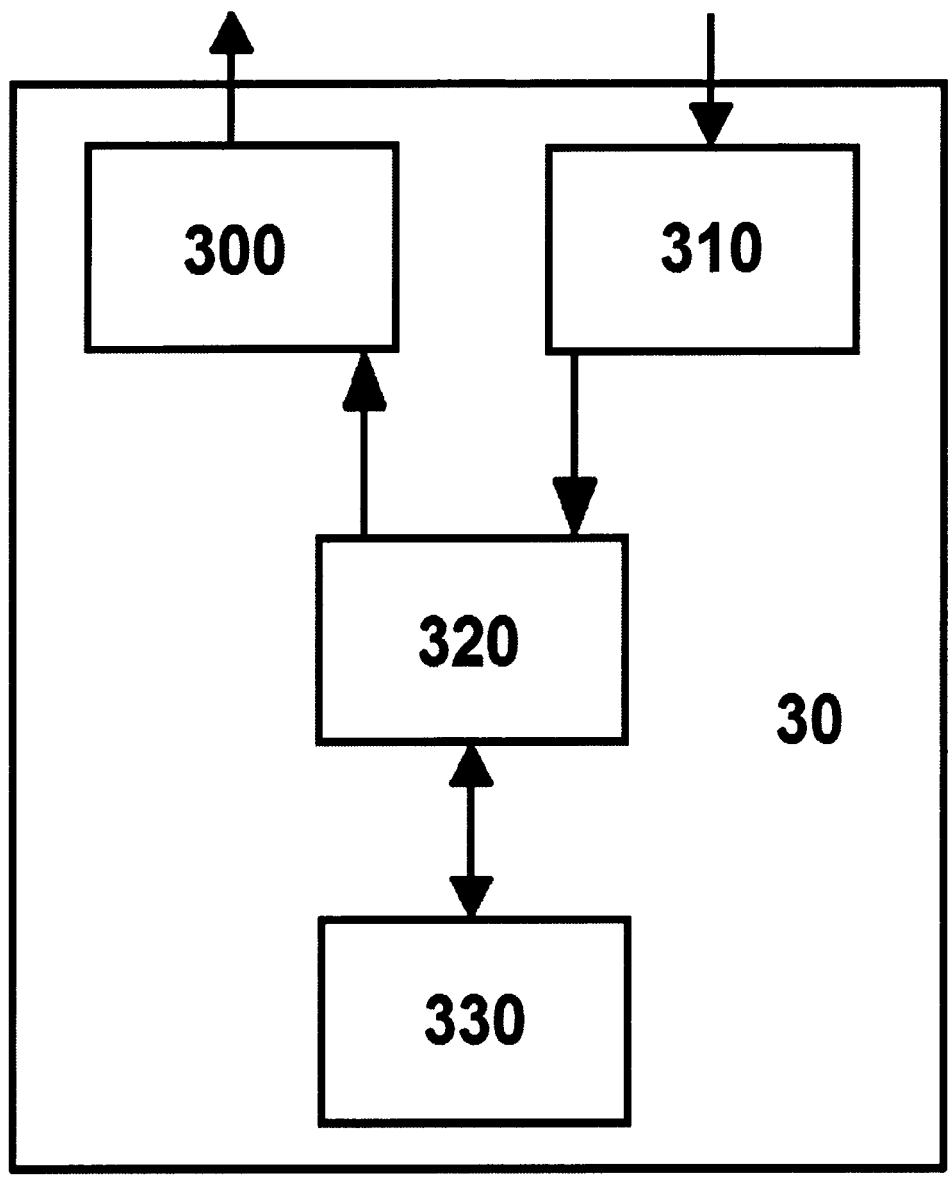
FIG. 3 shows an exemplary structure of a MSC-Server enhanced for SR-VCC embodying the invention.

FIG. 3 shows an exemplary structure of a MSC-Server enhanced for SR-VCC embodying the invention. Said MSC-Server (30) is involved in a Handover procedure for a call from a source RAN (E-UTRAN) to a target RAN (GERAN/UTRAN CS).

The MSC-Server (30) is equipped with means for sending (300) an indication that a session transfer for said call should be performed towards the target RAN. Said sending means (300) may be embodied in a transmitter.

Furthermore, the MSC-Server (30) is equipped with a receiver (310) for receiving from a mobility management entity (MME or SGSN) of the source RAN an indication that a relocation request having initiated the session transfer indication is canceled.

Additionally, receiver (310) may further be adapted to send an indication that the session transfer should be cancelled towards the SCC AS in the IMS which has performed the session transfer.

In a further embodiment, transmitter (300) may further be arranged to send an indication that a session transfer for said call should be prepared but not yet activated towards the target RAN.

Within said embodiment, the MSC Server (30) comprises receiver (310) for receiving from a mobility management entity (MME or SGSN) of the source RAN an indication that a relocation request having initiated the session transfer indication is canceled, and transmitter (300) may further be adapted to send an indication that the prepared session transfer should be cancelled towards the SCC AS in the IMS which has performed the session transfer.

Furthermore, all embodiments of the MSC Server may comprise a processor (320) for evaluation or determination of various conditions as described above. Processor (320) may be embodied in an ASIC or an FPGA or some other circuitry.

In still further embodiments of the MSC Server, storage (330) for storing various parameters such as call related routing information of the source and/or target RAN are provisioned. Said storage may be embodied in any kind of memory such as RAM.

Figure 4:
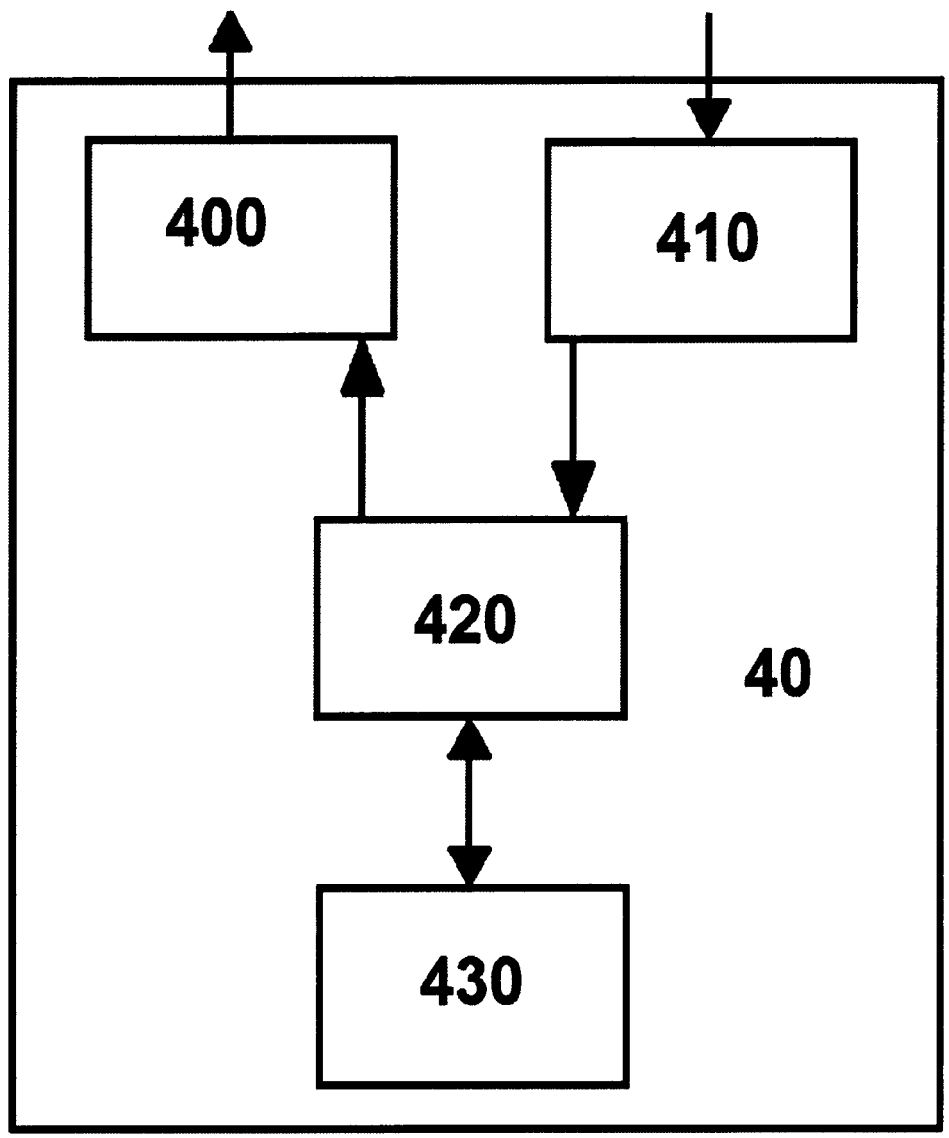
FIG. 4 shows an exemplary structure of an SCC Application server embodying the invention.

FIG. 4 shows an exemplary structure of an SCC Application server embodying the invention. Said SCC AS is involved in a Handover procedure for a call from a source RAN (E-UTRAN) to a target RAN (GERAN/UTRAN CS).

The SCC AS comprises receiver (410) for receiving an indication that a session transfer should be performed from a MSC Server enhanced for SR-VCC of the source RAN.

Furthermore, said SCC AS comprises storage (430) for storing various parameters such as call related routing information of the source and/or target RAN are provisioned, e.g. SDP information for media over said source RAN for said call. Storage (430) may be embodied in any kind of memory such as RAM.

Receiver (410) may be arranged to receive an indication that the session transfer should be cancelled from said MSC Server enhanced for SR-VCC.

Furthermore, said SCC AS comprises transmitter (400) which is adapted to update the remote end of the call to send the respective media to the UE involved in said call via source RAN (E-UTRAN).

Furthermore, all embodiments of the SCC AS may comprise processor (420) for evaluation or determination of various conditions as described above. Processor (420) may be embodied in an ASIC or an FPGA or some other circuitry.

Abbreviations

EPC Evolved Packet Core
EPS Evolved Packet System
ICS IMS Centralized Services
SR-VCC Single Radio Voice Call Continuity
STI Session Transfer URI (according to 3GPP TS 23.237)
STN Session Transfer Number
E-UTRAN Evolved UTRAN

The invention claimed is:

1. A method of handover in an Internet Protocol Multimedia System (IMS) network utilizing a Mobile Switching Centre (MSC) Server enhanced for Single Radio Voice Call Continuity (SR-VCC) for a call from a source Radio Access Network (RAN) to a target RAN, the method comprising the steps of:
   sending an indication from the MSC Server that a session transfer for the call should be prepared but not yet activated towards the target RAN;
   receiving at the MSC Server, from a Mobility Management Entity (MME) of the source RAN, an indication that a relocation request having initiated the session transfer is canceled; and
   sending an indication from the MSC Server towards a Service Centralization and Continuity Application Server (SCC AS) in the IMS to cancel the session transfer.

2. The method according to claim 1, wherein the source RAN comprises an evolved Universal Terrestrial Radio Access Network (E-UTRAN) or a UTRAN High Speed Packet Access (HSPA), the target RAN comprises a GSM EDGE Radio Access Network (GERAN) or UTRAN Circuit Switched (CS), the MME is included in a serving Gateway Signaling Node (SGSN) and the step of sending an indication to cancel the session transfer is included in a Session Initiation Protocol (SIP) message.

3. The method according to claim 2, wherein the SIP message is a SIP INVITE message indicating no media, indicating revoke media or, is a SIP INFO message including necessary parameters.

4. The method according to claim 1 wherein the session transfer is activated by a further step of sending an activation command towards the SCC AS.

5. The method according to claim 4, wherein the step of sending the activation command is performed after having received an indication that the handover is complete.

6. The method according to claim 4, wherein the activation command is performed by means of a SIP INFO message.

7. A method of handover in a Service Centralization and Continuity Application Server (SCC AS) for a call from a source Radio Access Network (RAN) to a target RAN, the method comprising the steps of:
   receiving an indication, from a Mobile Switching Centre (MSC) Server enhanced for Single Radio Voice Call Continuity (SR-VCC), that a session transfer should be prepared but not yet activated towards the target RAN;
   storing Session Description Protocol (SDP) information for media over the source RAN for the call;
   receiving, from the MSC Server, an indication that the session transfer should be canceled; and updating a remote end of the call to send respective media to a User Equipment (UE) involved in the call via the source RAN.

8. The method according to claim 7, wherein the source RAN comprises an evolved Universal Terrestrial Radio Access Network (E-UTRAN) or a UTRAN High Speed Packet Access (HSPA), the target RAN comprises a GSM EDGE Radio Access Network (GERAN) or UTRAN Circuit Switched (CS), and the step of updating is based on the SDP information and comprises a Session Initiation Protocol (SIP) re-INVITE towards the remote end of the call.

9. The method according to claim 7, wherein a session on the source RAN is held until an activation command is received.

10. The method according to claim 7, further comprising the step of receiving a notification from the MSC Server that the session transfer is canceled.

11. The method according to claim 7, further comprising the step of receiving an activation command to activate the session transfer.

12. The method according to claim 11, wherein activation of the session transfer is performed by an update of the remote end.

13. The method according to claim 7, wherein the step of receiving the indication that the session transfer should be canceled towards the SCC AS includes receiving the indication via SIP signaling over Packet Switched (PS) access from a UE.

14. A Mobile Switching Centre (MSC) Server enhanced for Single Radio Voice Call Continuity (SR-VCC) being involved in a handover procedure for a call from a source Radio Access Network (RAN) to a target RAN, the MSC Server comprising:

means for sending an indication that a session transfer for the call that should be prepared but not yet activated towards the target RAN;

means for receiving, from a Mobility Management Entity (MME) of the source RAN, an indication that the relocation request having initiated the session transfer is canceled; and the means for sending further adapted to send an indication that the session transfer should be cancelled towards a Service Centralization and Continuity Application Server (SCC AS) in an Internet Protocol Multimedia System (IMS) which has performed the session transfer.

15. A Service Centralization and Continuity Application Server (SCC AS) being involved in a handover procedure for a call from a source Radio Access Network (RAN) to a target RAN, the SCC AS comprising:

means for
receiving an indication from a Mobile Switching Centre (MSC) Server enhanced for Single Radio Voice Call Continuity (SR-VCC)
that a session transfer for the call should be prepared but not yet activated towards the target RAN;

means for storing Session Description Protocol (SDP) information for media over the source RAN for the call, the means for receiving further adapted to receive an indication that the session transfer should be canceled from the MSC Server: and means for sending an update to a remote end of the call to send respective media to a User Equipment (UE) involved in the call via the source RAN.

* * * * *